United States Patent
McPherson et al.

(10) Patent No.: US 10,740,477 B2
(45) Date of Patent: *Aug. 11, 2020

(54) AUTOMATIC PARAMETER VALUE GENERATION

(71) Applicant: Red Hat, Inc., Raleigh, NC (US)

(72) Inventors: Daniel McPherson, Raleigh, NC (US); Benjamin M. Parees, Durham, NC (US); Clayton P. Coleman, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,773

(22) Filed: Mar. 18, 2019

(65) Prior Publication Data

US 2019/0213337 A1 Jul. 11, 2019

Related U.S. Application Data

(63) Continuation of application No. 15/244,652, filed on Aug. 23, 2016, now Pat. No. 10,242,205.

(51) Int. Cl.
*G06F 21/60* (2013.01)
*G06F 21/45* (2013.01)
*H04L 29/06* (2006.01)

(52) U.S. Cl.
CPC ............ *G06F 21/604* (2013.01); *G06F 21/45* (2013.01); *H04L 63/083* (2013.01); *H04L 63/107* (2013.01); *H04L 63/20* (2013.01)

(58) Field of Classification Search
CPC ..... G06F 21/604; G06F 21/45; H04L 63/083; H04L 63/20; H04L 63/107

(Continued)

(56) References Cited

U.S. PATENT DOCUMENTS

| 8,140,855 B2 * | 3/2012 | Zhu .................. G06F 21/34 713/184 |
| 8,458,763 B2 | 6/2013 | Gottimukkala et al. |

(Continued)

FOREIGN PATENT DOCUMENTS

| CN | 102571948 A | 7/2012 |
| CN | 103051631 A | 4/2013 |

OTHER PUBLICATIONS

Author Unknown, "Automate Password Reset & Unlock Accounts with ADSelfService Plus," Manage Engine, available at least as early as Jul. 4, 2016, 3 pages, https://www.manageengine.com/products/self-service-password/automatic-password-reset.html.

(Continued)

*Primary Examiner* — Kambiz Zand
*Assistant Examiner* — Aubrey H Wyszynski
(74) *Attorney, Agent, or Firm* — Withrow & Terranova, PLLC

(57) ABSTRACT

Automatic parameter value generation is disclosed. It is determined that a parameter value generation trigger associated with a parameter has occurred. A parameter value in accordance with a format of the parameter value is obtained. At least one location associated with a first component to which the parameter value is to be communicated is determined. The parameter value is communicated to the at least one location, and a parameter value refresh policy associated with the first component is determined.

14 Claims, 6 Drawing Sheets

(58) Field of Classification Search
USPC .......................................................... 726/1
See application file for complete search history.

(56) References Cited

U.S. PATENT DOCUMENTS

| | | | |
|---|---|---|---|
| 9,047,107 B2 | 6/2015 | Walsh et al. | |
| 9,294,456 B1 | 3/2016 | Timmermans | |
| 2009/0119177 A1* | 5/2009 | John | G06Q 20/18 705/14.54 |
| 2010/0014110 A1* | 1/2010 | Munetomo | H04N 1/0084 358/1.14 |
| 2013/0198718 A1 | 8/2013 | Kunze et al. | |
| 2015/0172321 A1 | 6/2015 | Kirti et al. | |
| 2016/0147949 A1* | 5/2016 | Bess | G06F 16/22 705/3 |

OTHER PUBLICATIONS

Bond, James, "Best practices for security in an automated cloud environment," O'Reilly Media, Inc., Dec. 15, 2015, 12 pages, https://www.oreilly.com/ideas/best-practices-for-security-in-an-automated-cloud-environment.

Borges, Hélder Pereira et al., "Automatic generation of platforms in cloud computing," Abstract, 2012 IEEE Network Operations and Management Symposium, Apr. 16-20, 2012, 2 pages, http://ieeexplore.ieee.org/document/6212068/?tp=&arnumber=6212068&url=http:%2F%2Fieeexplore.ieee.org%2Fxpls%2Fabs_all.jsp%3Farnumber%3D6212068.

Non-Final Office Action for U.S. Appl. No. 15/244,652, dated Jun. 8, 2018, 13 pages.

Notice of Allowance for U.S. Appl. No. 15/244,652, dated Nov. 13, 2018, 7 pages.

* cited by examiner

US 10,740,477 B2

AUTOMATIC PARAMETER VALUE GENERATION

This application is a continuation of co-pending U.S. patent application Ser. No. 15/244,652, filed on Aug. 23, 2016, entitled "AUTOMATIC PARAMETER VALUE GENERATION," which is hereby incorporated herein by reference in its entirety.

TECHNICAL FIELD

The examples relate generally to the automatic generation of a parameter value for a component, and the installation of the parameter value in the component.

BACKGROUND

It is often desirable, or necessary, to generate new parameter values associated with components. For example, to increase security, it may be desirable to periodically change a password that is required to access a database component, or to obtain a new certificate. In order to change the password, a new password is generated, and the database component is informed of the new password. Moreover, any other component that accesses the database component must be made aware of the new password so that the database component allows such other components to access the database component. Thus, in a relatively large distributed system, hundreds or even thousands of components may require notification of the new password.

SUMMARY

The examples facilitate automatic parameter value generation and installation. Among other advantages, the examples automatically determine when a trigger has occurred that indicates a parameter value should be generated. Upon the occurrence of such a trigger, the examples automatically obtain a parameter value in accordance with a designated format. The examples then install the parameter value in the appropriate components and implement a designated parameter value refresh policy associated with the components, if appropriate. In some examples, the parameter value is not presented to a human, eliminating security issues that may otherwise arise if the parameter value were known.

In one example, a method of automatic parameter value generation is provided. The method includes determining, by a computing device comprising a processor device, that a parameter value generation trigger associated with a parameter has occurred. The method further includes obtaining a parameter value in accordance with a format of the parameter value. The method further includes determining at least one location associated with a first component to which the parameter value is to be communicated, and communicating the parameter value to the at least one location. The method further includes determining a parameter value refresh policy associated with the first component.

In another example, a computing device for automatic parameter value generation is provided. The computing device comprises a memory and a processor device coupled to the memory. The processor device is to determine that a parameter value generation trigger associated with a parameter has occurred. The processor device is further to obtain a parameter value in accordance with a format of the parameter value. The processor device is further to determine at least one location associated with a first component to which the parameter value is to be communicated, and communicate the parameter value to the at least one location. The processor device is further to determine a parameter value refresh policy associated with the first component.

In another example, a computer program product for automatic parameter value generation is provided. The computer program product is stored on a non-transitory computer-readable storage medium and includes instructions configured to cause a processor device to determine that a parameter value generation trigger associated with a parameter has occurred. The instructions further cause the processor device to obtain a parameter value in accordance with a format of the parameter value. The instructions further cause the processor device to determine at least one location associated with a first component to which the parameter value is to be communicated, and communicate the parameter value to the at least one location. The instructions further cause the processor device to determine a parameter value refresh policy associated with the first component.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
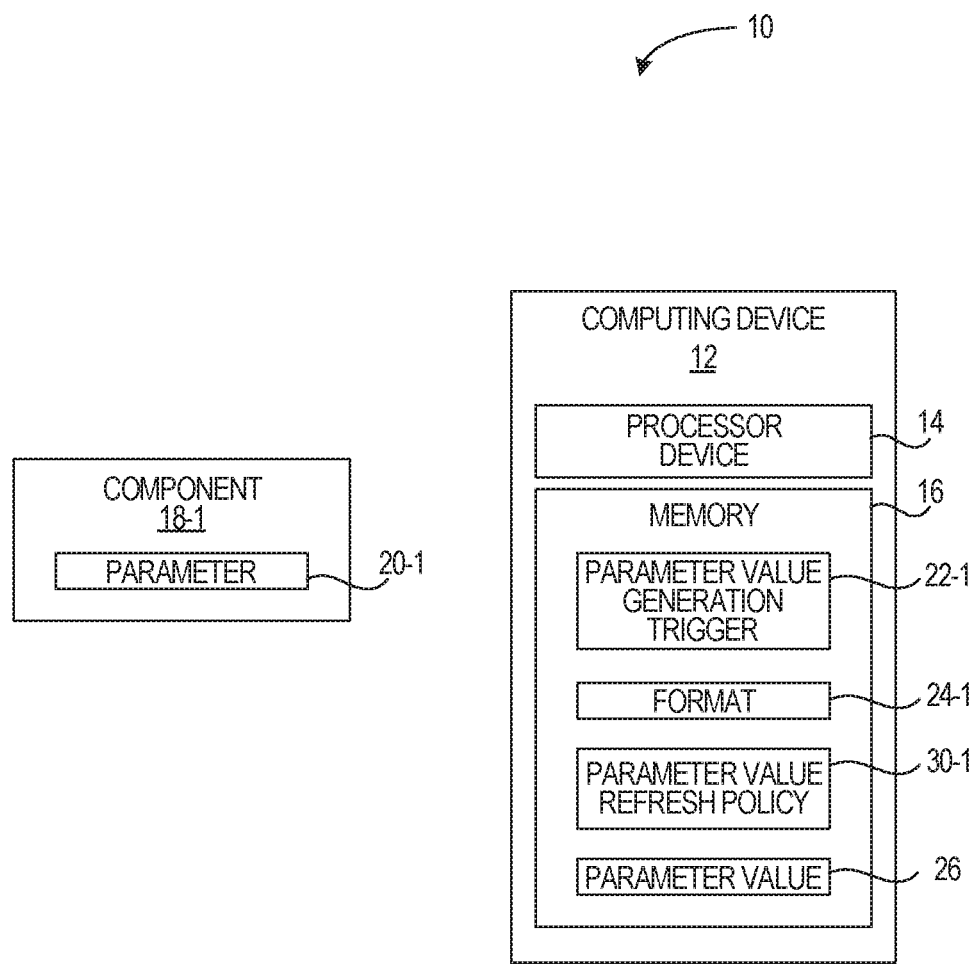
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first component" and "second component," and does not imply a priority, a type, an importance, or other attribute, unless otherwise stated herein. As used herein and in the claims, the articles "a" and "an" in reference to an element refers to "one or more" of the element unless otherwise explicitly specified.

It is often desirable, or necessary, to generate new parameter values associated with components. For example, to increase security, it may be desirable to periodically change a password that is required to access a database component. In order to change the password, a new password is generated, and the database component is informed of the new password. Moreover, any other component that accesses the database component must be made aware of the new password so that the database component allows such other components to access the database component. Thus, in a relatively large distributed system, hundreds or even thousands of components may require notification of the new password.

Generating and installing the new parameter values in the appropriate components can be logistically challenging for a number of reasons. Information that identifies when a new parameter value should be generated must be continually monitored. Rules regarding the format of the new parameter value must be maintained and complied with when generating the new parameter value. Manually installing the new parameter value in hundreds or thousands of components can be time consuming and may require specialized training. Information regarding which components must be restarted in order to install the new parameter value must be maintained and followed. Dependencies between components may exist such that it may be necessary to install the new parameter value in components in a particular order. Moreover, in some situations, such as with respect to passwords, it may be desirable that a human not have access to the new parameter value for security reasons.

The examples facilitate automatic parameter value generation and installation. Among other advantages, the examples automatically determine when a trigger has occurred that indicates a parameter value should be generated. Upon the occurrence of such a trigger, the examples automatically obtain a parameter value in accordance with a designated format. The examples then install the parameter value in the appropriate components and implement a designated parameter value refresh policy associated with the components, if appropriate. In some examples, the parameter value is not presented to a human, eliminating security issues that may otherwise arise if the parameter value were known.

Figure 2:
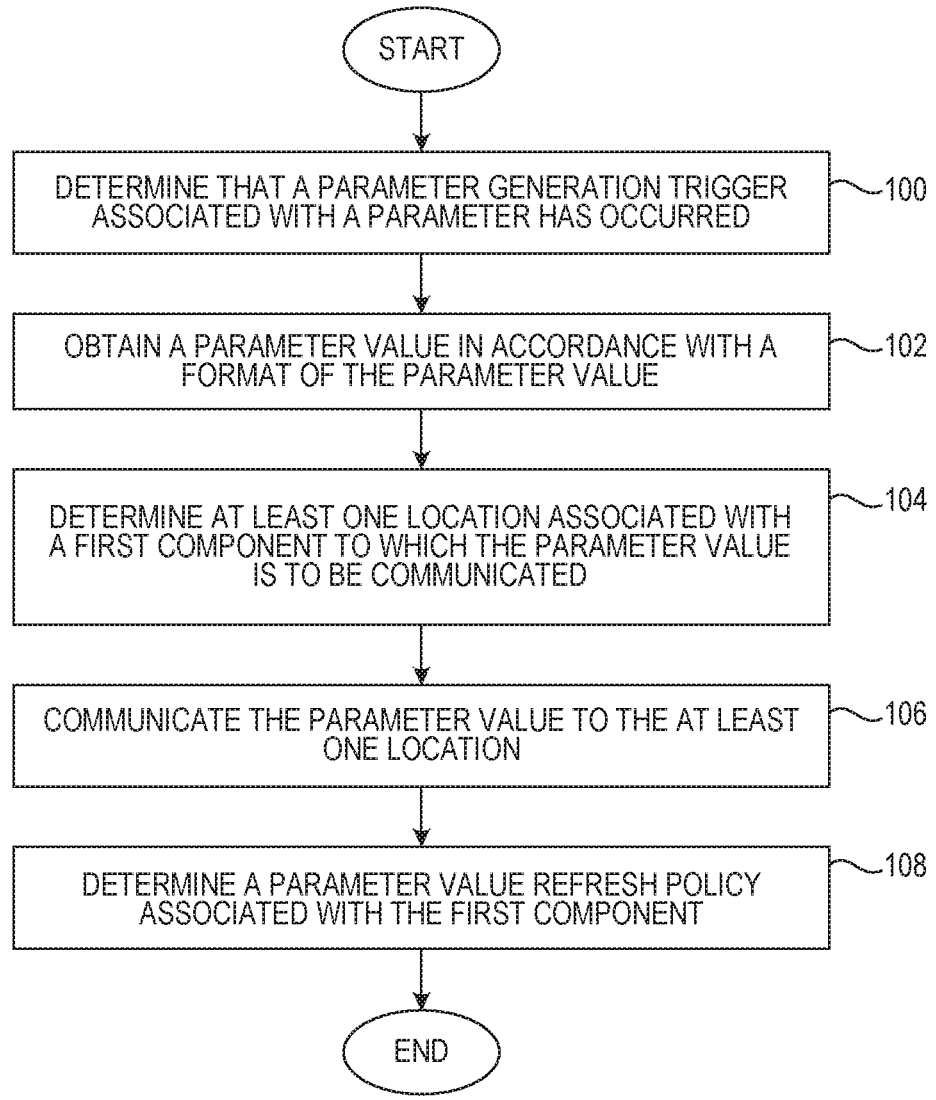
FIG. 2 is a flowchart of a method for automatic parameter value generation according to one example.

FIG. 1 is a block diagram of an environment 10 in which examples may be practiced. FIG. 2 is a flowchart of a method for automatic parameter value generation according to one example. FIGS. 1 and 2 will be discussed together. Referring first to FIG. 1, the environment 10 includes a computing device 12 that implements aspects of the examples. The computing device 12 includes a processor device 14 and a memory 16 to which the processor device 14 is communicatively coupled.

A component 18-1 contains a parameter 20-1 that has a parameter value that is to be changed upon the occurrence of a parameter value generation trigger 22-1. The parameter 20-1 may comprise any information, such as a password or the like. Referring now to FIG. 2, a method for automatic parameter value generation according to one example will be discussed in conjunction with FIG. 1. The computing device 12 determines that the parameter value generation trigger 22 associated with the parameter 20-1 has occurred (FIG. 2, block 100). The parameter value generation trigger 22-1 may comprise any suitable trigger, such as, by way of non-limiting example, a time interval, such as one week or one month. In the latter example, the computing device 12 determines that the parameter value generation trigger 22 has occurred when one month has passed since a previous parameter value generation of the parameter value.

The computing device 12 obtains a parameter value for the parameter 20-1 that is in accordance with a format 24-1 of the parameter 20-1 (FIG. 2, block 102). In one example, the computing device 12 obtains a parameter value 26 by generating the parameter value 26 in accordance with the format 24-1. Example mechanisms for determining the format 24-1 will be discussed below. In another example, the computing device 12 obtains the parameter value 26 by requesting the parameter value 26 from a parameter value generating component, and receiving the parameter value from the parameter value generating component. The computing device 12 determines at least one location 28 associated with the component 18-1 to which the parameter value 26 is to be communicated (FIG. 2, block 104). For example, the location 28 may comprise a location of the component 18-1, or may comprise, for example, a location of a file in which the parameter value 26 is to be stored. In another example, the location 28 may comprise a reference to an invocable object.

The computing device 12 communicates the parameter value 26 to the at least one location 28 (FIG. 2, block 106). For example, the computing device 12 may send the parameter value 26 to the component 18-1 via an inter-process communication mechanism, such as a port, an application programming interface, or the like. In another example, the computing device 12 may write the parameter value 26 to a designated file. In yet another example, the computing device 12 may invoke a reference to an object and pass the parameter value 26 to the object.

The computing device 12 determines a parameter value refresh policy 30-1 associated with the component 18-1 (FIG. 2, block 108). The parameter value refresh policy 30-1 may indicate, for example, that the component 18-1 needs to be restarted to install the parameter value 26 in the component 18-1. Alternatively, the parameter value refresh policy 30-1 may indicate that no action need be taken to install the parameter value 26 in the component 18-1. In yet another example, the parameter value refresh policy 30-1 may indicate that a message should be sent to the component 18-1, or that a function or method of the component 18-1 should be invoked, in order to install the parameter value 26 in the component 18-1. As will be discussed in greater detail below, in some examples the parameter value 26 may be installed in a plurality of components, and the parameter value refresh policy 30-1 may indicate that each of the plurality of components are to be restarted, or that only certain of the components are to be restarted. In some examples, the parameter value refresh policy 30-1 may indicate that the components are to be restarted in a particular order.

Figure 3:
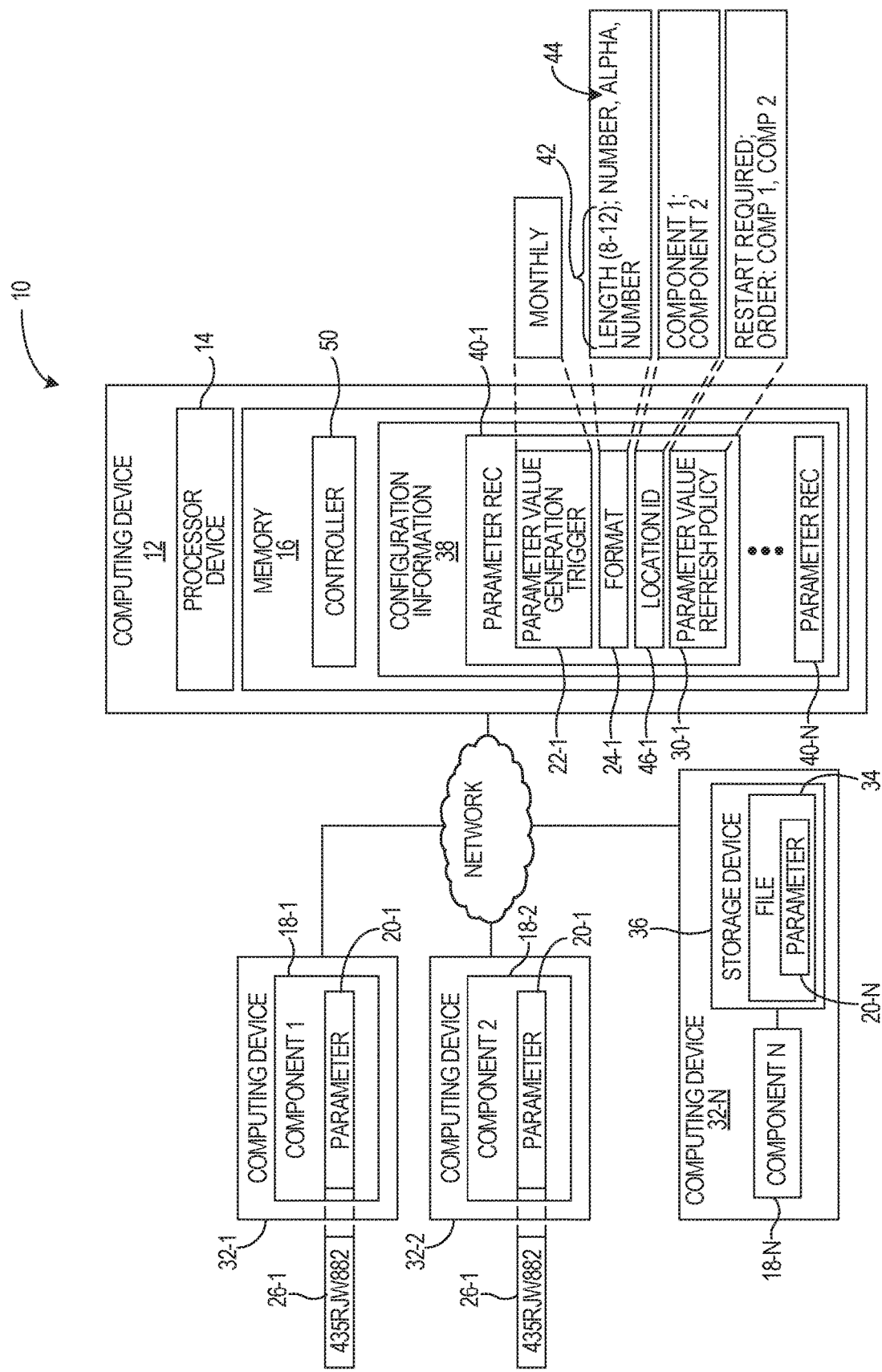
FIG. 3 is a more detailed block diagram of the environment illustrated in FIG. 1 according to one example.

FIG. 3 is a more detailed block diagram of the environment 10 illustrated in FIG. 1 according to one example. In this example the component 18-1 is a process that executes on a computing device 32-1. The environment 10 also includes a computing device 32-2 on which a component 18-2 executes. The environment 10 further includes a computing device 32-N on which a component 18-N executes. The components 18-1, 18-2, and 18-N may compose a single distributed system.

The component 18-1 includes the parameter 20-1, and the component 18-2 also includes the parameter 20-1. In this example, the parameter 20-1 comprises a password. At a particular point in time, the parameter 20-1 of the component 18-1 may have a parameter value 26-1, and the parameter 20-1 of the component 18-2 has the same parameter value 26-1. In operation, for example, the component 18-1 may comprise a database that requires a password from any component 18 that accesses the component 18-1. The component 18-2 may comprise a process that accesses the component 18-1. Thus, prior to providing access to the component 18-2, the component 18-1 must receive a correct password from the component 18-2.

In operation, the component 18-2 passes the parameter value 26-1 stored in the component 18-2 to the component 18-1. The component 18-1 then determines if the parameter value 26-1 received from the component 18-2 matches the parameter value 26-1 stored in the component 18-1. If the parameter values 26-1 match, the component 18-2 allows the component 18-1 to access the component 18-2. Because the parameter value 26-1 of the component 18-2 must match the parameter value 26-1 of the component 18-1 in order for the component 18-2 to access the component 18-1, the parameter values 26-1, if changed, should be changed in conjunction with one another. While for purposes of illustration only the component 18-2 is illustrated as accessing the component 18-1, in practice, tens, hundreds, or thousands of components may access the component 18-1, and thus changing the parameter value of the parameter 20-1 should be done in conjunction with the tens, hundreds, or thousands of other components.

A component 18-N has an associated parameter 20-N that is maintained in a file 34 stored in a storage device 36.

The computing device 12 includes configuration information 38. The configuration information 38 includes a plurality of parameter records 40-1-40-N (generally, parameter records 40). Each parameter record 40 corresponds to a parameter 20, and contains information suitable for generating a new parameter value for the corresponding parameter 20, and installing the new parameter value in one or more components 18. In one example, the parameter records 40 may be generated manually wherein the information is entered by a human being and stored on a storage device accessible by the computing device 12.

As an example, the parameter record 40-1 corresponds to the parameter 20-1 of the components 18-1, 18-2. The parameter record 40-1 includes the parameter value generation trigger 22-1 that identifies when the parameter value of the parameter 20-1 is to be changed. In this example, the parameter value generation trigger 22-1 indicates that the parameter value of the parameter 20-1 is to be changed monthly. The parameter record 40-1 also includes the format 24-1 that identifies a format of the parameter value. In this example, the format 24-1 includes a parameter value length field 42 that indicates the parameter value should have a parameter value length between 8and 12 bytes long. The format 24-1 also includes a parameter value syntax field 44 that identifies a parameter value syntax with which the parameter value should comport. In this example, the parameter value syntax field 44 indicates that the parameter value should comprise a number followed by one or more alphabetic characters, followed by another number.

The parameter record 40-1 includes a location identifier (ID) 46-1 that identifies at least one location associated with a component 18 to which the parameter value is to be communicated. In this example, the location ID 46-1 identifies two locations, the component 18-1 and the component 18-2, to which the parameter value is to be communicated. The parameter value refresh policy 30-1 indicates that a restart is required to install the parameter value in the components 18-1 and 18-2. The parameter value refresh policy 30-1 also indicates that the components 18-1 and 18-2 should be restarted in a particular order. Specifically, the parameter value refresh policy 30-1 indicates that the component 18-1 should first be restarted, and then subsequently the component 18-2 should be restarted.

In some examples, a component of the computing device 12, such as a controller 50, may execute on the computing device 12 to implement at least some of the functionality discussed herein. Because the controller 50 is a component of the computing device 12, functionality implemented by the controller 50 may be attributed to the computing device 12 generally. Moreover, in examples where the controller 50 comprises software instructions that program the processor device 14 to carry out functionality discussed herein, functionality implemented by the controller 50 may be attributed herein to the processor device 14.

Figure 4:
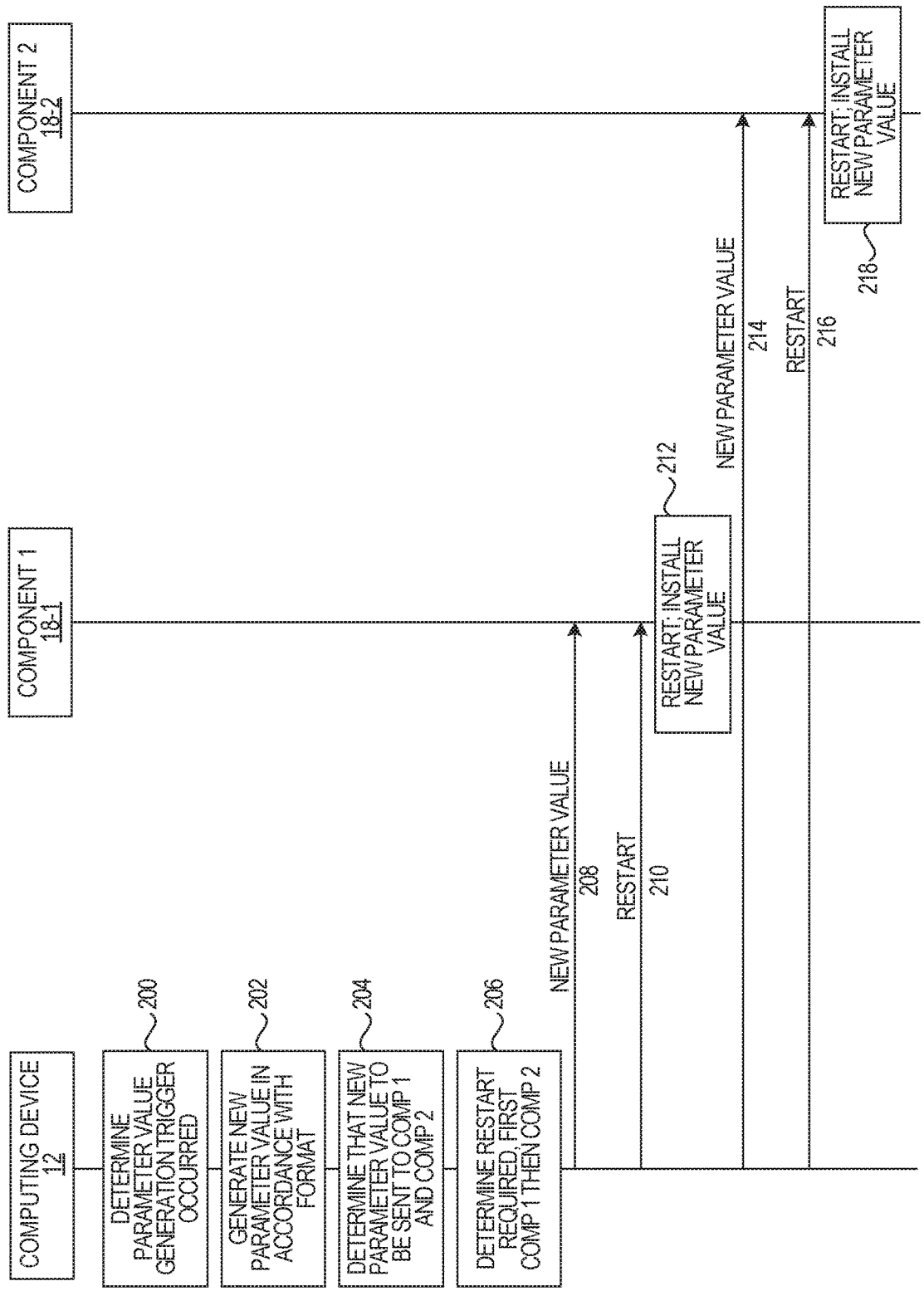
FIG. 4 is a message flow diagram that illustrates processing and message flows between a computing device and components to generate and install a new parameter value according to one example.

FIG. 4 is a message flow diagram that illustrates processing and message flows between the computing device 12 and the components 18-1, 18-2 to generate and install a new parameter value according to one example. FIG. 4 will be discussed in conjunction with FIG. 3. Initially, the computing device 12 determines that the parameter value generation trigger 22-1 has occurred (FIG. 4, step 200). In this example, the computing device 12 determines that the parameter value generation trigger 22-1 has occurred by determining that a period of time equal to one month has elapsed since a last time the parameter value associated with the parameter 20-1 was changed. In one example, the computing device 12 stores a timestamp that identifies a date and time of a previous generation of the parameter value associated with the parameter 20-1, and continually monitors a current day and time to determine when one month has elapsed since the day and time identified by the timestamp.

While the parameter value generation trigger 22-1 identifies an interval of time as the trigger, the examples are not limited to parameter value generation triggers that comprise periods of time. In one example, a parameter value generation trigger comprises a request from a component to generate a parameter value. For example, the component 18-1 may be programmed to periodically initiate a request to the computing device 12 to change the parameter value associated with the parameter 20-1. In another example, the computing device 12 may determine that a component 18 has been updated. The determination that the component 18 has been updated may comprise a parameter value generation trigger that causes the computing device 12 to generate a parameter value.

The computing device 12 generates a new parameter value in accordance with the format 24-1 (FIG. 4, step 202). In this example, the computing device 12 generates a parameter value that has a length between 8 and 12 bytes in accordance with the parameter value length field 42. In addition, the computing device 12 generates a parameter value that comprises one or more numbers concatenated to one or more alphabetic characters concatenated to one or more additional numbers in accordance with the parameter value syntax. As an example, the computing device 12 may generate a first random or pseudo-random three digit number, a random or pseudo-random three character alphabetic string, and a second random or pseudo-random three digit number, and concatenate the first three digit number, the three character alphabetic string, and the second three digit number to generate the new parameter value.

In other examples, the computing device 12 obtains the parameter value in accordance with the format 24-1 of the parameter value from a parameter value generating component. For example, the parameter may comprise a certificate that is generated by the parameter value generating component in accordance with a particular certificate format. The computing device 12 requests a new certificate from the parameter value generating component. The parameter value generating component generates a new certificate in accordance with a certificate format and sends the new certificate to the computing device 12.

The computing device 12 accesses the location ID 46-1 and determines that the new parameter value is to be communicated to the component 18-1 and the component 18-2 (FIG. 4, step 204). The computing device 12 accesses the parameter value refresh policy 30-1 of the parameter record 40-1 and determines that the component 18-1 and the component 18-2 are to be restarted, and that the component 18-1 is to be restarted first (FIG. 4, step 206). The computing device 12 sends the new parameter value to the component 18-1 (FIG. 4, step 208). The computing device 12 sends the component 18-1 a restart command (FIG. 4, step 210). The component 18-1 restarts, and installs the new parameter value (FIG. 4, step 212).

The computing device 12 sends the new parameter value to the component 18-2 (FIG. 4, step 214). The computing device 12 sends the component 18-2 a restart command (FIG. 4, step 216). The component 18-1 restarts and installs the new parameter value (FIG. 4, step 218).

Figure 5:
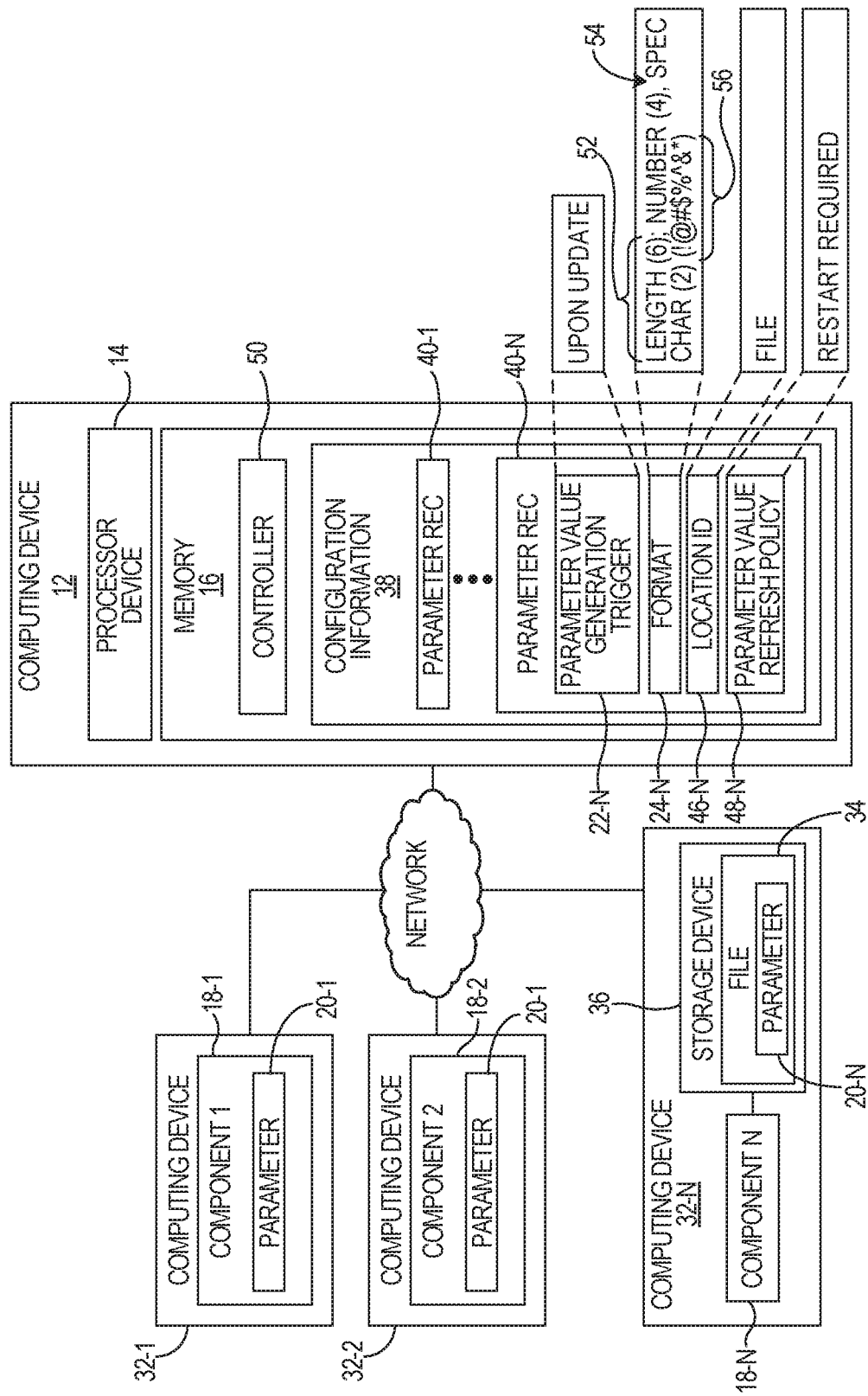
FIG. 5 is a block diagram of the environment illustrated in FIG. 3 illustrating in greater detail a parameter record that corresponds to a parameter according to one example.

FIG. 5 is a block diagram of the environment 10 illustrating the parameter record 40-N that corresponds to the parameter 20-N in greater detail. The parameter record 40-N includes a parameter value generation trigger 22-N that indicates a new parameter value for the parameter 20-N should be generated when the component 18-N is updated. A format 24-N includes a parameter value length field 52 that indicates the parameter value should have a parameter value length of six bytes. The format 24-N also includes a parameter value syntax field 54 that identifies a parameter value syntax with which the parameter value should comport. In this example, the parameter value syntax field 54 indicates that the parameter value should comprise a four digit number followed by two special characters selected from a predetermined set 56 of special characters.

A location ID 46-N indicates that the new parameter value is to be stored in the file 34. A parameter value refresh policy 48-N indicates that the component 18-N is to be restarted after the new parameter value is stored in the file 34.

Figure 6:
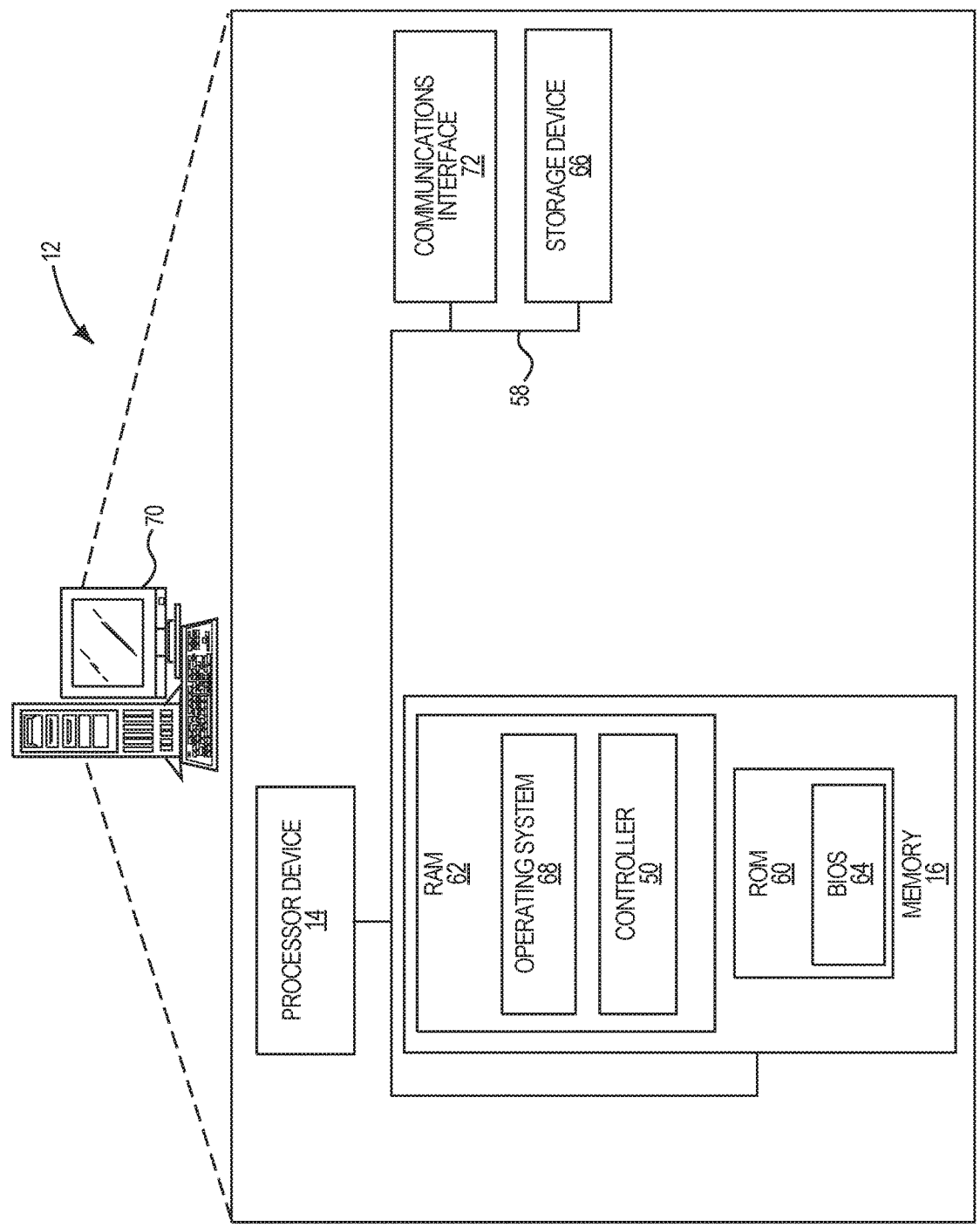
FIG. 6 is a block diagram of a computing device according to one example.

FIG. 6 is a block diagram of the computing device 12 suitable for implementing examples. The computing device 12 may comprise any computing or electronic device capable of including firmware, hardware, and/or executing software instructions to implement the functionality described herein, such as a computer server, a desktop computing device, a laptop computing device or the like. The computing device 12 includes the processor device 14, the memory 16, and a system bus 58. The system bus 58 provides an interface for system components including, but not limited to, the memory 16 and the processor device 14. The processor device 14 can be any commercially available or proprietary processor.

The system bus 58 may be any of several types of bus structures that may further interconnect to a memory bus (with or without a memory controller), a peripheral bus, and/or a local bus using any of a variety of commercially available bus architectures. The memory 16 may include non-volatile memory 60 (e.g., read-only memory (ROM), erasable programmable read-only memory (EPROM), electrically erasable programmable read-only memory (EEPROM), etc.), and volatile memory 62 (e.g., random-access memory (RAM)). A basic input/output system (BIOS) 64 may be stored in the non-volatile memory 60 and can include the basic routines that help to transfer information between elements within the computing device 12. The volatile memory 62 may also include a high-speed RAM, such as static RAM, for caching data.

The computing device 12 may further include or be coupled to a non-transitory computer-readable storage medium such as a storage device 66, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 66 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of processes can be stored in the storage device 66 and in the volatile memory 62, including an operating system 68 and one or more components, such as the controller 50, which may implement the functionality described herein in whole or in part. It is to be appreciated that the examples can be implemented with various commercially available operating systems 68 or combinations of operating systems 68.

All or a portion of the examples may be implemented as a computer program product stored on a transitory or non-transitory computer-usable or computer-readable storage medium, such as the storage device 66, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14.

An operator may also be able to enter one or more configuration commands or provide the configuration information 38 through a keyboard (not illustrated), a pointing device such as a mouse (not illustrated), or a touch-sensitive surface such as a display device 70. The computing device 12 may also include a communications interface 72 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
   maintaining, by a computing device comprising a processor device, configuration information comprising a plurality of parameter records, each parameter record identifying a set of components and a parameter format that identifies a format of a parameter value to be generated for the set of components, each set of components comprising at least one component;
   selecting a particular parameter record for a first component associated with the particular parameter record;
   obtaining a parameter value in accordance with the format of the parameter value associated with the particular parameter record;

based on the particular parameter record, determining a parameter value refresh policy associated with the first component; and wherein the parameter value refresh policy indicates that the first component is to be restarted, and causing the first component to restart.

2. The method of claim 1 wherein the parameter value refresh policy indicates that the first component and a second component are to be restarted, and further comprising causing the second component to restart.

3. The method of claim 1 further comprising:

communicating the parameter value to a location associated with the first component.

4. The method of claim 3 further comprising determining the location associated with the first component to which the parameter value is to be communicated by accessing the particular parameter record to determine the location.

5. The method of claim 3 wherein the location comprises a location of a file in which the parameter value is stored.

6. The method of claim 1 further comprising:

accessing a timestamp that identifies a time of a previous generation of a previous parameter value for the first component;

determining that a predetermined period of time has lapsed since the time identified by the timestamp; and wherein selecting the particular parameter record for the first component associated with the particular parameter record further comprises:

selecting the particular parameter record for the first component associated with the particular parameter record in response to determining that the predetermined period of time has lapsed since the time identified by the timestamp.

7. The method of claim 1 wherein the particular parameter record identifies the first component and a second component, and wherein the particular parameter record comprises a first location identifier that identifies a location associated with the first component and a second location identifier that identifies a location associated with the second component.

8. The method of claim 1 wherein the parameter value comprises a certificate, and the format of the parameter value comprises a certificate format.

9. The method of claim 1 wherein obtaining the parameter value in accordance with the format of the parameter value comprises generating the parameter value in accordance with the format of the parameter value.

10. The method of claim 1 wherein obtaining the parameter value in accordance with the format of the parameter value comprises:

requesting the parameter value from a parameter value generating component; and receiving the parameter value.

11. A computing device, comprising:

a memory; and a processor device coupled to the memory to:

maintain configuration information comprising a plurality of parameter records, each parameter record identifying a set of components and a parameter format that identifies a format of a parameter value to be generated for the set of components, each set of components comprising at least one component;

select a particular parameter record for a first component associated with the particular parameter record;

obtain a parameter value in accordance with the format of the parameter value associated with the particular parameter record;

based on the particular parameter record, determine a parameter value refresh policy associated with the first component; and wherein the parameter value refresh policy indicates that the first component is to be restarted, and cause the first component to restart.

12. The computing device of claim 11 wherein the parameter value refresh policy indicates that the first component and a second component are to be restarted, and wherein the processor device is further to cause the second component to restart.

13. A non-transitory computer program product stored on a non-transitory computer-readable storage medium and including instructions configured to cause a processor device to:

maintain configuration information comprising a plurality of parameter records, each parameter record identifying a set of components and a parameter format that identifies a format of a parameter value to be generated for the set of components, each set of components comprising at least one component;

select a particular parameter record for a first component associated with the particular parameter record;

obtain a parameter value in accordance with the format of the parameter value associated with the particular parameter record;

based on the particular parameter record, determine a parameter value refresh policy associated with the first component; and wherein the parameter value refresh policy indicates that the first component is to be restarted, and cause the first component to restart.

14. The method of claim 1 wherein the first component comprises a process configured to execute on a computing device.

* * * * *